United States Patent [19]
Katsuda

[11] Patent Number: 5,884,921
[45] Date of Patent: Mar. 23, 1999

[54] ELECTRIC CONTROL APPARATUS FOR DAMPER DEVICE IN SUSPENSION SYSTEM OF AUTOMOTIVE VEHICLE

[75] Inventor: Takayuki Katsuda, Okazaki, Japan

[73] Assignee: Toyota Jidosha Kabushiki Kaisha, Toyota, Japan

[21] Appl. No.: 919,852

[22] Filed: Aug. 28, 1997

[30] Foreign Application Priority Data

Aug. 29, 1996 [JP] Japan ................................. 8-228866

[51] Int. Cl.⁶ ........................... B60G 17/08; B60G 17/015
[52] U.S. Cl. ................................ 280/5.515; 188/266.1; 701/37
[58] Field of Search ................... 280/5.515, 5.519; 188/266.1, 266.2; 701/37

[56] References Cited

U.S. PATENT DOCUMENTS

| | | | |
|---|---|---|---|
| 5,322,320 | 6/1994 | Sahashi et al. | 280/5.515 |
| 5,324,069 | 6/1994 | Ogawa | 280/5.515 |
| 5,430,646 | 7/1995 | Kimura et al. | 280/5.515 |
| 5,697,634 | 12/1997 | Kamimae et al. | 280/5.515 |
| 5,701,245 | 12/1997 | Ogawa et al. | 280/5.515 |

FOREIGN PATENT DOCUMENTS 5294122A  11/1993  Japan .

Primary Examiner—Peter C. English
Attorney, Agent, or Firm—Kenyon & Kenyon

[57] ABSTRACT

An electric control apparatus for a damper device in a suspension system of an automotive vehicle, wherein absolute velocity of a sprung mass of the vehicle and relative velocity of the sprung mass to an unsprung mass of the vehicle in vertical movement are detected to determine a target damping coefficient in a predetermined small value when the detected absolute velocity is different from the detected relative velocity in a movement direction and to increase the target damping coefficient in accordance with an increase of a ratio of the detected absolute velocity to the detected relative velocity when the detected absolute velocity coincides with the detected relative velocity in the movement direction, and wherein a magnitude of vertical vibration of the sprung mass is detected to correct the target damping coefficient to a predetermined small value when the detected magnitude of vertical vibration of the sprung mass is less than a predetermined value and to increase the maximum value of the target damping coefficient in accordance with an increase of the detected magnitude of vertical vibration of the sprung mass more than the predetermined value.

3 Claims, 4 Drawing Sheets

ELECTRIC CONTROL APPARATUS FOR DAMPER DEVICE IN SUSPENSION SYSTEM OF AUTOMOTIVE VEHICLE

BACKGROUND OF THE INVENTION

1. Field of the Invention

The present invention relates to a suspension system of an automotive vehicle, and more particularly to an electric control apparatus for controlling a damping coefficient of a damper device in the suspension system.

2. Description of the Prior Art

In Japanese Patent Laid-open Publication No. 5(1993)-294122, there has been proposed an electric control apparatus for a damper device in a suspension system of an automotive vehicle, wherein absolute velocity x' of a sprung mass of the vehicle in vertical movement and relative velocity y' of the sprung mass to an unsprung mass of the vehicle in vertical movement are detected to determine a target damping coefficient of the damper device in a small value when the detected absolute velocity x' is different from the relative velocity y' in a movement direction (when vibration of the sprung mass is in a vibration region) and to increase the target damping coefficient of the damper device in accordance with an increase of a velocity ratio x'/y' of the detected absolute velocity x' to the detected relative velocity y' when both the absolute velocity x' and relative velocity y' are coincident in the movement direction (when vibration of the sprung mass is in a damping region).

In the control apparatus described above, both the absolute velocity x' and relative velocity y' will change sinusoidal with a large phase difference. Particularly, when the sprung mass of the vehicle is vibrating at a low resonance frequency of about 1 Hz, the phase difference becomes approximately ninety degrees, and the velocity ratio x'/y' of the absolute velocity x' to the relative velocity y' changes sinusoidal as shown in FIG. 6. This means that the damping coefficient of the damper device suddenly increases when both the absolute velocity x' and relative velocity y' coincides in the movement direction. Such a sudden change of the damping coefficient will occur as well as at start of vibration of the sprung mass and deteriorate the riding comfort of the vehicle when the sprung mass was vibrated.

SUMMARY OF THE INVENTION

It is, therefore, a primary object of the present invention to provide an electric control apparatus for a damper device in a suspension system capable of overcoming the problems discussed above.

According to the present invention, the object is accomplished by providing an electric control apparatus for a damper device in a suspension system of an automotive vehicle, which comprises first detection means for detecting absolute velocity of a sprung mass of the vehicle in vertical movement, second detection means for detecting relative velocity of the sprung mass to an unsprung mass of the vehicle in vertical movement, means for determining a target damping coefficient in a predetermined small value when the detected absolute velocity is different from the detected relative velocity in a movement direction and for increasing the target damping coefficient in accordance with an increase of a ratio of the detected absolute velocity to the detected relative velocity when the detected absolute velocity coincides with the detected relative velocity in the movement direction, and setting means for setting a damping coefficient of the damper device to the target damping coefficient, wherein the electric control apparatus further comprises third detection means for detecting a magnitude of vertical vibration of the sprung mass, and correction means for correcting a maximum value of the target damping coefficient to a predetermined small value when the detected magnitude of vertical vibration of the sprung mass is less than a predetermined value and for increasing the maximum value of the target damping coefficient in accordance with an increase of the detected magnitude of vertical vibration of the sprung mass more than the predetermined value.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
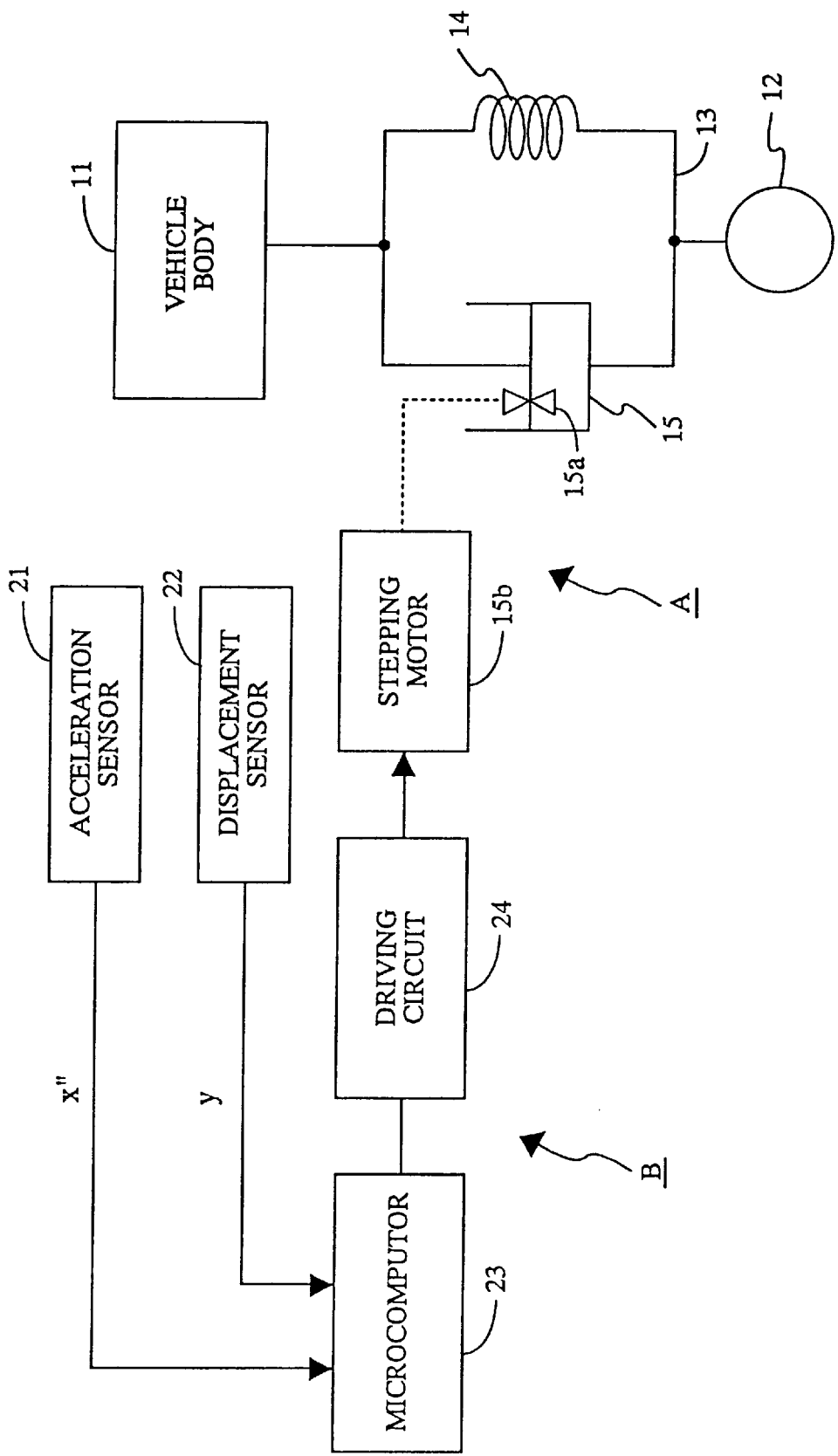
FIG. 1 is a schematic illustration of an electric control apparatus for a damper device in a suspension system of an automotive vehicle.

In FIG. 1 of the drawings, there is schematically illustrated a preferred embodiment of an electric control apparatus B for a damper device 15 in a suspension system A of an automotive vehicle in accordance with the present invention. The suspension system A includes a sprung mass in the form of a body structure 11 of the vehicle, an unsprung mass in the form of a lower arm member 13 connected at its one end to the sprung mass 11 for supporting a road wheel 12 at its other end, and a coil spring 14 disposed in parallel with the damper device 15 between the sprung mass 11 and unsprung mass 13 to resiliently support the sprung mass 11 on the unsprung mass 13. The damper device 15 is constructed to produce a damping force in proportion to relative velocity of the sprung mass 11 to the road wheel 12 and unsprung mass 13 in vertical movement. The damper device 15 is provided therein with a variable orifice 15a the opening degree of which is adjusted by operation of an actuator in the form of a stepping motor 15b for controlling a damping coefficient of the damper device.

The electric control apparatus B comprises an acceleration sensor 21, a displacement sensor 22, a microcomputer 23 and a driving circuit 24. The acceleration sensor 21 is mounted on the vehicle body structure 11 to detect acceleration x" of the vehicle body structure 11 in vertical movement for producing an electric signal indicative of the detected acceleration x". Provided that, acceleration x" of the vehicle body structure 11 in upward vertical movement is represented by a positive value, and acceleration x" of the vehicle body structure 11 in downward movement is represented by a negative value. The displacement sensor 22 is disposed between the vehicle body structure 11 and the lower arm member 13 to detect a relative vertical displacement amount y of the vehicle body structure 11 to the road wheel 12 and lower arm member 13 for producing an electric signal indicative of the detected displacement amount y. Provided that, an increased amount of displacement from a standard value (an expanded amount of the damper device 15) is represented by a positive value, and a decreased amount of displacement from the standard value (a contracted amount of the damper device 15) is represented by a negative value.

Figure 2:
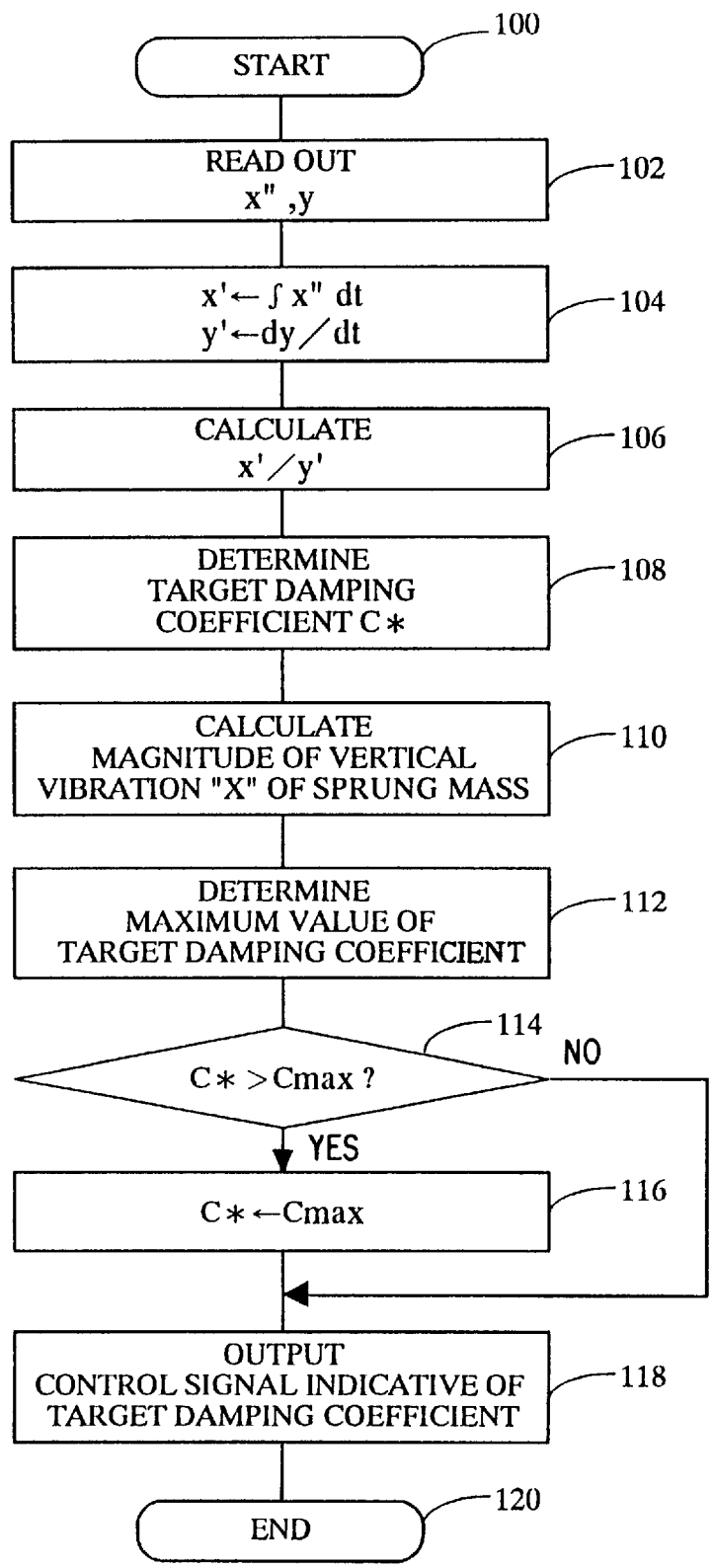
FIG. 2 is a flow chart of a control program executed by a microcomputer shown in FIG. 1.

The microcomputer 23 is programmed to repeat execution of a control program shown by a flow chart in FIG. 2 at each lapse of a predetermined time under control of a timer contained therein for determining a target damping coefficient C* and for applying a control signal indicative of the target damping coefficient C* to the driving circuit 24. When applied with the control signal, the driving circuit 24 activates the stepping motor 15b to control the opening degree of the variable orifice in the damper device 15 for setting the damping coefficient of the damper device 15 to the target damping coefficient C*.

Figure 3:
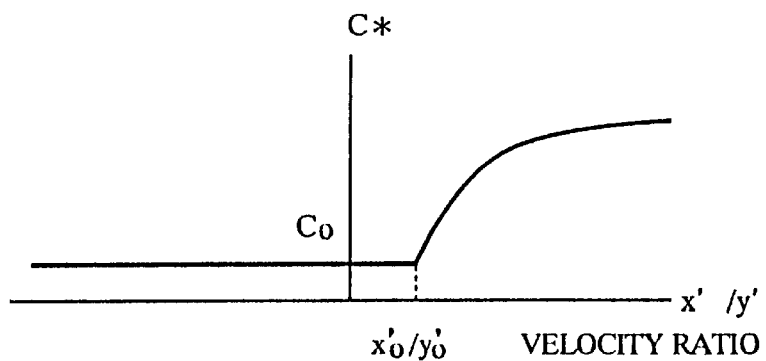
FIG. 3 is a graph showing a target damping coefficient in relation to a velocity ratio x'/y' of absolute velocity of a sprung mass of the vehicle to relative velocity of the sprung mass to an unsprung mass of the vehicle in vertical movement.
Figure 6:
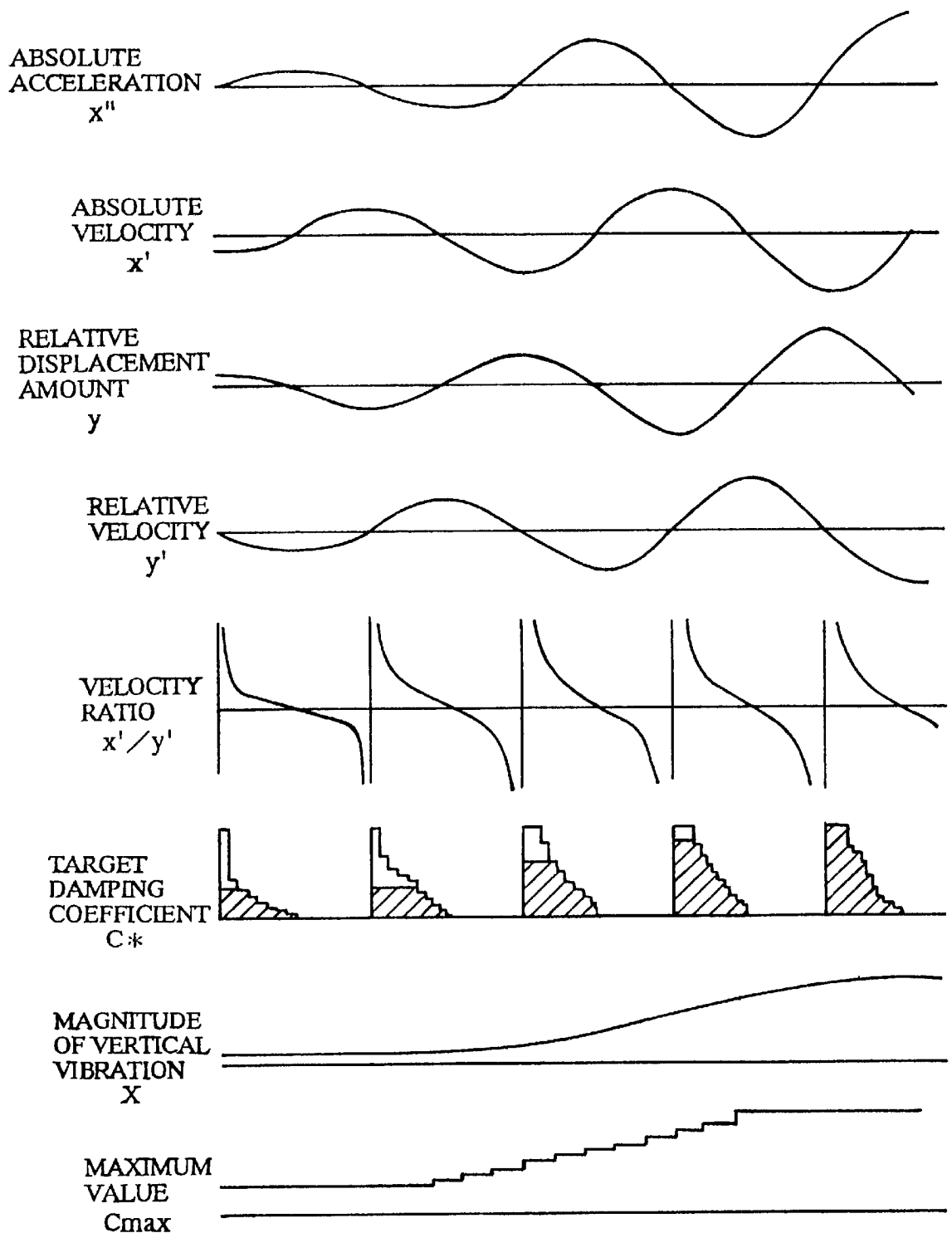
FIG. 6 is a time chart showing a changing condition of absolute acceleration x" in vertical movement, absolute velocity x' in vertical movement, a relative displacement amount y, relative velocity y' in vertical movement, a velocity ratio x'/y' of the absolute velocity x' to the relative velocity y', a target damping coefficient C*, a magnitude X of vibration and a maximum value Cmax of the damping coefficient.

In operation of the electric control apparatus, the computer 23 starts execution of the control program at step 100 and reads out at step 102 acceleration x " of the vehicle body structure 11 in vertical movement and a vertical displacement amount y detected by the sensors 21 and 22. At the following step 104, the computer 23 calculates absolute velocity x' of the vehicle body structure in vertical movement by time differentiation of the detected acceleration x" and calculates relative velocity y' of the vehicle body structure 11 to the road wheel 12 and lower arm member 13 in vertical movement by time differentiation of the detected vertical displacement amount y. Subsequently, the computer 23 calculates at step 106 a velocity ratio x'/y' of the absolute velocity x' to the relative velocity y' in vertical movement and causes the program to proceed to step 108. At step 108, the computer 23 determines a target damping coefficient C* in relation to the calculated velocity ratio x'/y' with reference to a target damping coefficient table stored therein as shown in FIG. 3. In this instance, if the calculated velocity ratio x'/y' is a negative value or less than a predetermined positive small value $x_0/y_0$, the computer 23 determines a predetermined positive small value $C_0$ as the target damping coefficient C*. If the calculated velocity ratio x'/y' increases more than the predetermined positive small value $x'_0/y'_0$, the computer 23 increases the target damping coefficient C* in accordance with an increase of the calculated velocity value x'/y'. Accordingly, when the absolute velocity x' and relative velocity y' in vertical movement are in the same phase and coincide in a movement direction as shown in FIG. 6, the target damping coefficient C* is steply decreased after rapidly increased. When the absolute velocity x' and relative velocity y' in vertical movement are different in phase and in a movement direction, a predetermined small value is determined as the target damping coefficient C*.

Figure 4:
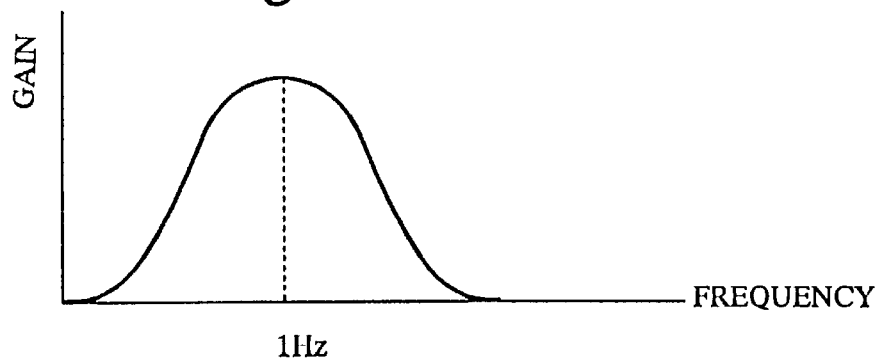
FIG. 4 is a graph showing a gain in relation to frequency of band-pass filter processing in execution of the control program.

Subsequently, the computer 23 integrates at step 110 an absolute value of acceleration x" detected by acceleration sensor 21 to calculate a magnitude X of vibration of the vehicle body structure. Since vertical vibration of the vehicle body structure 11 to be dampened in this embodiment is in a low resonant frequency region, it is desirable that a magnitude X of vertical vibration of the vehicle body structure in the low frequency region is calculated by bandpass filter processing at low frequency (for instance, 1 Hz) before or after the foregoing calculation as shown in FIG. 4.

Figure 5:
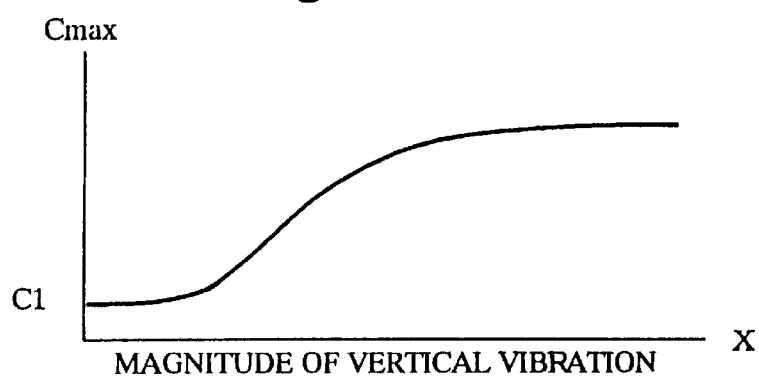
FIG. 5 is a graph showing a maximum value Cmax of the damping coefficient in relation to a magnitude of vibration.

After calculation of the magnitude X of vertical vibration of the vehicle body structure, the computer 23 calculates at step 112 a maximum value Cmax of the damping coefficient in relation to the magnitude X of vertical vibration of the vehicle body structure with reference to a maximum value table stored therein as shown in FIG. 5. Memorized in the maximum value table is a maximum value Cmax of the damping coefficient increasing from a predetermined small value in accordance with an increase of the magnitude of vibration. After determination of the maximum value Cmax, the computer 23 determines at step 114 whether the target damping coefficient C* is larger than the maximum value Cmax or not. If the answer at step 114 is "Yes", the computer 23 changes at step 116 the target damping coefficient C* to the maximum value Cmax. As a result, the target damping coefficient C* is limited as shown by hatched portions in FIG. 6. If the answer at step 114 is "No", the computer 23 applies at step 118 a control signal indicative of the target damping coefficient C* to the driving circuit 24 and finishes execution of the control program at step 120. When applied with the control signal from the computer 23, the driving circuit 24 controls activation of the stepping motor 15b for setting the damping coefficient of the damper device to the target damping coefficient C*. Upon lapse of the predetermined short time after execution of the control program, the computer 23 resumes execution of processing at step 100 to 120 of the control program to apply a control signal indicative of a newly determined target damping coefficient C* to the driving circuit 24 so that the damping coefficient of the damper device 15 is set to the target damping coefficient C*.

From the above description, it will be understood that when a magnitude X of vertical vibration of the vehicle body structure is less than a predetermined value, the maximum value of the damping coefficient of the damper device 15 is corrected to the predetermined small value by processing at step 112–116 to avoid a sudden increase of the damping coefficient immediately after the occurrence of vertical vibration of the vehicle body structure 11. This is effective to enhance the riding comfort of the vehicle at a transit period when the vehicle body structure starts to vibrate in a vertical direction. Since in this embodiment, the target damping coefficient C* is determined in accordance with the velocity ratio x'/y', the target damping coefficient C* will be set in a large value when the relative velocity y' in vertical movement is approximately "0". For this reason, the restriction of the maximum value Cmax is effective to enhance the riding comfort of the vehicle. When the magnitude X of vertical vibration of the vehicle body structure increases, the maximum value Cmax of the damping coefficient of the damper device 15 is increased in accordance with the velocity ratio x'/y' by processing at step 112 and 114 of the control program. This is effective to cause a damping force sufficient for restraining vertical vibration of the vehicle body structure.

Although in the above embodiment, the absolute velocity x' and relative velocity y' in vertical movement have been calculated by integration of acceleration x" of the vehicle body structure in vertical movement detected by the acceleration sensor 21 and differentiation of a vertical displacement amount y detected by the displacement sensor 22, the integration and differentiation may be carried out by a hardware circuit or the absolute velocity x' and relative velocity y' in vertical movement may be directly detected by the sensors.

In a practical embodiment of the present invention, a modern control theory such as a Kalman filter may be adapted to estimate either one of the absolute velocity x' and relative velocity y' in vertical movement based on a physical amount related to the other velocity in vertical movement detected by one of the sensors.

Although in the above embodiment, the magnitude X of vertical vibration of the vehicle body structure has been calculated by processing at step 110 of the control program using the absolute velocity x" in vertical movement detected by the acceleration sensor 21, a vibration sensor may be mounted on the vehicle body structure to directly detect a magnitude of vertical vibration of the vehicle body structure.

In the above embodiment, a low frequency component of vertical vibration of the vehicle body structure has been detected taking into account the facts that the responsiveness of a commercially available actuator is currently less than a low frequency region. However, if the actuator was improved to enhance responsiveness in a high frequency region, vertical vibration of the vehicle body structure would be detected in the whole frequency region.

What is claimed is:

1. An electric control apparatus for a damper device in a suspension system of an automotive vehicle, comprising:

first detection means for detecting absolute velocity of a sprung mass of the vehicle in vertical movement;

second detection means for detecting relative velocity of the sprung mass to an unsprung mass of the vehicle in vertical movement;

means for determining a target damping coefficient in a predetermined small value when the detected absolute velocity is different from the detected relative velocity in a movement direction and for increasing the target damping coefficient in accordance with an increase of a velocity ratio of the detected absolute velocity to the detected relative velocity when the detected absolute velocity coincides with the detected relative velocity in the movement direction; and setting means for setting a damping coefficient of the damper device to the target damping coefficient;

wherein the electric control apparatus further comprises:

third detection means for detecting a magnitude of vertical vibration of the sprung mass; and correction means for correcting a maximum value of the target damping coefficient to a predetermined small value when the detected magnitude of vertical vibration of the sprung mass is less than a predetermined value and for increasing the maximum value of the target damping coefficient in accordance with an increase of the detected magnitude of vertical vibration of the sprung mass more than the predetermined value.

2. An electric control apparatus for a damper device as recited in claim 1, wherein said third detection means comprises means for detecting acceleration of the sprung mass in vertical movement and calculation means for calculating the magnitude of vertical vibration of the sprung mass by integration of an absolute value of the detected acceleration.

3. An electric control apparatus for a damper device as recited in claim 1, wherein said third detection means comprises means for detecting the magnitude of vertical vibration of the sprung mass in a low frequency region.

* * * * *